(12) United States Patent
Hofer et al.

(10) Patent No.: US 8,140,816 B2
(45) Date of Patent: Mar. 20, 2012

(54) UTILIZING PARTITION RESOURCE REQUIREMENTS FROM WORKLOAD ESTIMATION TO AUTOMATE PARTITION SOFTWARE CONFIGURATION AND VALIDATION

(75) Inventors: Kent LeDel Hofer, Plainview, MN (US); Jossie Maite McManus, Rochester, MN (US); Nathan Allan Rabe, Rochester, MN (US); Tammy Lynn Van Hove, Elgin, MN (US)

(73) Assignee: International Business Machines Corporation, Armonk, NY (US)

( * ) Notice: Subject to any disclaimer, the term of this patent is extended or adjusted under 35 U.S.C. 154(b) by 1057 days.

(21) Appl. No.: 12/038,946

(22) Filed: Feb. 28, 2008

(65) Prior Publication Data

US 2008/0148254 A1 Jun. 19, 2008

Related U.S. Application Data

(63) Continuation-in-part of application No. 11/128,062, filed on May 12, 2005, now Pat. No. 7,386,698.

(51) Int. Cl.
 *G06F 12/00* (2006.01)
(52) U.S. Cl. ........ 711/173; 711/111; 711/154; 711/156; 717/174; 717/175; 713/1; 713/2; 713/100; 718/104
(58) Field of Classification Search ............... 711/173, 711/174, 111, 154, 156; 717/174, 175; 713/1, 713/2, 100; 718/104
See application file for complete search history.

(56) References Cited

U.S. PATENT DOCUMENTS

| | | | |
|---|---|---|---|
| 5,367,686 A | 11/1994 | Fisher et al. | |
| 5,819,061 A | 10/1998 | Glassen et al. | |
| 6,112,301 A | 8/2000 | Johnson | |
| 6,182,275 B1 | 1/2001 | Beelitz et al. | |
| 7,036,009 B2 | 4/2006 | Hiramoto | |
| 7,055,149 B2 | 5/2006 | Birkholz et al. | |
| 7,140,020 B2 * | 11/2006 | McCarthy et al. | 718/104 |
| 7,748,005 B2 * | 6/2010 | Romero et al. | 718/104 |
| 2004/0003266 A1 * | 1/2004 | Moshir et al. | 713/191 |
| 2004/0177352 A1 * | 9/2004 | Narayanaswamy et al. | 717/169 |

(Continued)

OTHER PUBLICATIONS

"IBM Redbooks | What is a Hardware Management Console (HMC)?", Oct. 2003, IBM Corporation.

(Continued)

*Primary Examiner* — Stephen Elmore
(74) *Attorney, Agent, or Firm* — Martin & Associates LLC; Bret J. Petersen

(57) ABSTRACT

A method and apparatus for utilizing partition resource requirements to automate computer partition configuration. Partition resource requirements that are collected by a workload estimator include the type and version of software that is to be run on each partition of the system and the minimum hardware resources needed for each of the plurality of partitions on a partition by partition basis. The partition resource requirements are included in a system plan that is passed to other tools to configure a system based on the system plan. The tools that use the system plan include a deployment wizard that uses the system plan file to configure a system upgrade, and an ordering tool that passes the partition resource requirements to the manufacturer to allow the manufacturer to configure a new system based on the workload information in the system plan file.

20 Claims, 6 Drawing Sheets

U.S. PATENT DOCUMENTS

| | | |
|---|---|---|
| 2004/0215917 A1 | 10/2004 | Lambeth et al. |
| 2004/0261060 A1* | 12/2004 | Haselden et al. ............. 717/120 |
| 2006/0095708 A1 | 5/2006 | Sater et al. |
| 2006/0248524 A1* | 11/2006 | Seely ............................ 717/174 |
| 2009/0064156 A1* | 3/2009 | He et al. ........................ 718/104 |

OTHER PUBLICATIONS

Brian R. Smith, et al., "iSeries e-Business Handbook: A Technology and Product Reference," Mar. 2001, IBM Corporation—International Technical Support Organization, 2nd Edition, pp. 275-276.

* cited by examiner

UTILIZING PARTITION RESOURCE REQUIREMENTS FROM WORKLOAD ESTIMATION TO AUTOMATE PARTITION SOFTWARE CONFIGURATION AND VALIDATION

CROSS-REFERENCE TO PARENT APPLICATION

This patent application is a continuation-in-part (CIP) of U.S. application Ser. No. 11/128,062 U.S. Pat. No. 7,386,698, having common inventors and titled "Apparatus And Method For Automatically Defining, Deploying and Managing Hardware And Software Resources In A Logically Partitioned Computer System", which was filed May 12, 2005, and which is incorporated herein by reference.

BACKGROUND

1. Technical Field

This disclosure generally relates to partition software configuration of a multi-partition computer system, and more specifically relates to a method and apparatus for utilizing partition resource requirements from workload estimation by a workload estimator to automate partition software configuration and validation.

2. Background Art

Planning and specifying new computer systems or system upgrades is a complicated task faced by computer system administrators. Tools have been developed to simply this process. These tools include workload estimators, system planning tools, and software configuration tools. See for example U.S. patent application Ser. No. 11/128,062 filed May 12, 2005, titled "Apparatus and method for automatically defining, deploying and managing hardware and software resources in a logically-partition computer system."

A workload estimator is a tool used by the system administrator to size a computer server system to carry the specified workload needed by the user. The workload estimator can be used to size a new system, to size an upgrade to an existing system, or to size a consolidation of several systems. Workload Estimator (WLE) developed by International Business Machines Corporation (IBM) is a web-based sizing tool for computer systems manufactured by IBM. The WLE allows measurement input to best reflect the current workload of a user and provide a variety of built-in workloads to reflect emerging application requirements. The WLE provides current and growth recommendations for processor, memory, and disk that satisfy the user specified workloads and performance requirements. The WLE recommends the system model including processor, memory, and DASD requirements that are necessary to handle the overall workload with reasonable performance expectations. A user selects one or more workloads and answers a few questions about each workload. Based on the answers, the WLE generates a system recommendation and shows the predicted CPU utilization of the recommended system.

System planning tools are available to help the system administrator to plan and validate the hardware and partitions of the system. The data from the system planning tool can be used by a deployment wizard that applies the system plan to computer hardware, or it can be used by an order tool to specify hardware from a manufacturer.

In the prior art, the type of workloads for each partition are specified in the workload estimator, but this information is not completely utilized in configuring and validating the partitions of the system by the deployment wizard or by the manufacturer to configure new equipment. The partition by partition resource information does not flow through to the subsequent tools. Without a way to provide a level of automation to install and validate the software components on the partitions that correspond to the workloads the customer specified with the workload estimator, the system administrators will continue to suffer from less efficient ways of hardware deployment and software configuration.

BRIEF SUMMARY

The disclosure and claims herein are directed to a method and apparatus for utilizing partition resource requirements from workload estimation to automate computer partition configuration and validation. The partition resource requirements that are collected by the workload estimator includes the type and version of software that is to be run on each partition of the system and the hardware resources needed to support this software for each partition on a partition by partition basis. The partition resource requirements are included in a system plan that is passed to other tools to configure a system based on the system plan. The tools that use the system plan include a system planning tool, a deployment wizard that uses the system plan file to configure a system upgrade, and an ordering tool that passes the workload information to the manufacturer to allow the manufacturer to configure a new system based on the workload information in the system plan file. Each of the tools can utilize the partition by partition resource information for deployment and validation of the resource requirements based on the workload estimates from the workload estimator.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

DETAILED DESCRIPTION

The claims and disclosure herein provide a method and apparatus for utilizing partition resource requirements from workload estimation to automate computer partition configuration. The partition resource requirements are included in a system plan that is passed to other tools to configure a system based on the system plan. The tools that use the system plan include a system planning tool, a deployment wizard that uses the system plan file to configure a system upgrade, and an ordering tool that passes the partition resource requirements to the manufacturer to allow the manufacturer to configure a new system based on the partition resource requirements in the system plan.

Figure 1:
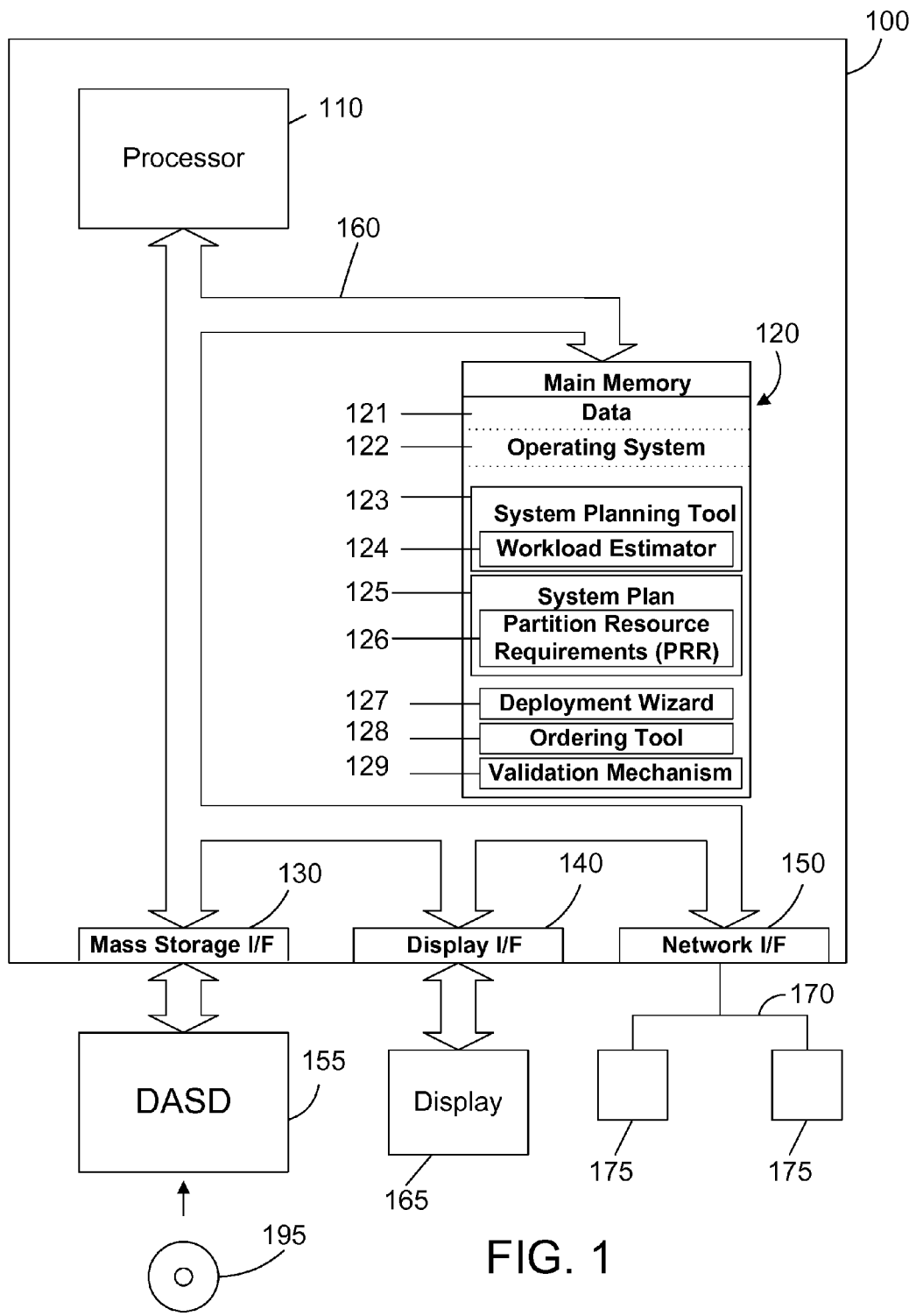
FIG. 1 is a block diagram of an apparatus with a workload estimator that creates partition resource requirements to be used by a deployment wizard and an ordering tool.

Referring to FIG. 1, a computer system 100 is one suitable implementation of a computer system that includes a workload estimator to gather partition resource requirements in a system plan and use the workload estimator to automatically configure computer partitions and applications. Computer system 100 is an IBM eServer System i computer system. However, those skilled in the art will appreciate that the disclosure herein applies equally to any computer system, regardless of whether the computer system is a complicated multi-user computing apparatus, a single user workstation, or an embedded control system. As shown in FIG. 1, computer system 100 comprises one or more processors 110, a main memory 120, a mass storage interface 130, a display interface 140, and a network interface 150. These system components are interconnected through the use of a system bus 160. Mass storage interface 130 is used to connect mass storage devices, such as a direct access storage device 155, to computer system 100. One specific type of direct access storage device 155 is a readable and writable CD-RW drive, which may store data to and read data from a CD-RW 195.

Main memory 120 preferably contains data 121 and an operating system 122. Data 121 represents any data that serves as input to or output from any program in computer system 100. Operating system 122 is a multitasking operating system known in the industry as i5/OS; however, those skilled in the art will appreciate that the spirit and scope of this disclosure is not limited to any one operating system. The memory further includes a system planning tool 123 with a workload estimator 124, a system plan 125 with partition resource requirements 126, a deployment wizard 127, an ordering tool 128 and a validation mechanism 129. Each of these entities in memory is described further below.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while data 121, operating system 122, system planning tool 123, workload estimator 124, system plan 125, partition resource requirements 126, deployment wizard 127, ordering tool 128 and validation mechanism 129 are shown to reside in main memory 120, those skilled in the art will recognize that these items are not necessarily all completely contained in main memory 120 at the same time. It should also be noted that the term "memory" is used herein generically to refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 122.

Although computer system 100 is shown to contain only a single processor and a single system bus, those skilled in the art will appreciate that the methods of resource configuration and validation described herein may be practiced using a computer system that has multiple processors and/or multiple buses. In addition, the interfaces that are used preferably each include separate, fully programmed microprocessors that are used to off-load compute-intensive processing from processor 110. However, those skilled in the art will appreciate that these functions may be performed using I/O adapters as well.

Display interface 140 is used to directly connect one or more displays 165 to computer system 100. These displays 165, which may be non-intelligent (i.e., dumb) terminals or fully programmable workstations, are used to provide system administrators and users the ability to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect computer system 100 to other computer systems or workstations 175 via network 170. Network interface 150 broadly represents any suitable way to interconnect electronic devices, regardless of whether the network 170 comprises present-day analog and/or digital techniques or via some networking mechanism of the future. In addition, many different network protocols can be used to implement a network. These protocols are specialized computer programs that allow computers to communicate across a network. TCP/IP (Transmission Control Protocol/Internet Protocol) is an example of a suitable network protocol.

At this point, it is important to note that while the description above is in the context of a fully functional computer system, those skilled in the art will appreciate that the workload estimator and the other software type entities described herein may be distributed as an article of manufacture in a variety of forms, and the claims extend to all suitable types of computer-readable media used to actually carry out the distribution, including recordable media such as floppy disks and CD-RW (e.g., 195 of FIG. 1).

Embodiments herein may also be delivered as part of a service engagement with a client corporation, nonprofit organization, government entity, internal organizational structure, or the like. These embodiments may include configuring a computer system to perform some or all of the methods described herein, and deploying software, hardware, and web services that implement some or all of the methods described herein.

Figure 2:
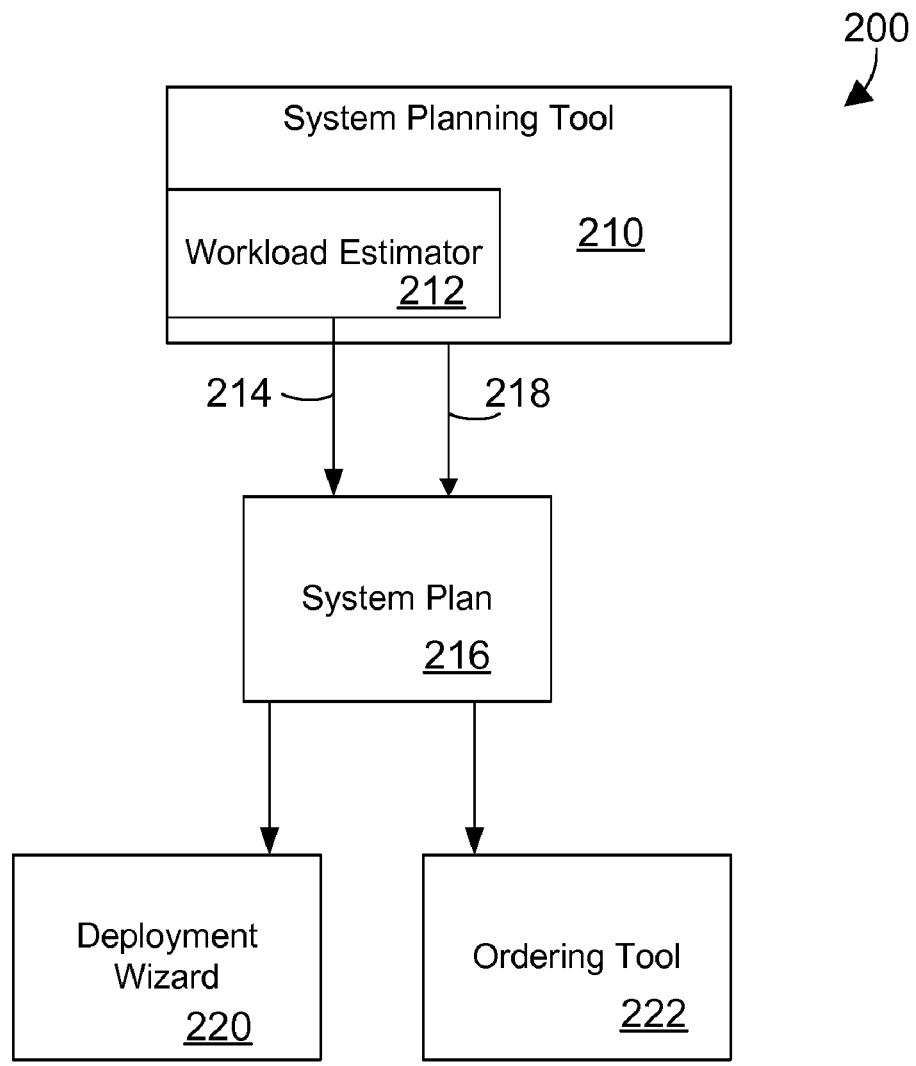
FIG. 2 is a block diagram of a system for utilizing a system planning tool with a workload estimator according to the prior art.

FIG. 2 represents a system planning environment 200 as known in the prior art. The system planning tool 210 includes a workload estimator 212, or the workload estimator 212 may be a separate tool (not shown). The prior art workload estimator 212 may provide base system parameters 214 to the system plan 216. The base system parameters 214 may include the system type (manufacturer model number), memory size, processor type, number and size of disk drives, etc. The system planning tool 210 may also provide additional system data 218 to the system plan 216. This additional system data 218 may include other optional features selected by the user to be included in the specified computer system. The system plan 216 is passed to a deployment wizard 220 to automate deployment of hardware and partition configuration. In addition, the system plan 216 is passed to an order tool 222 to identify hardware to be purchased for a new system that complies with the system plan 216.

Figure 3:
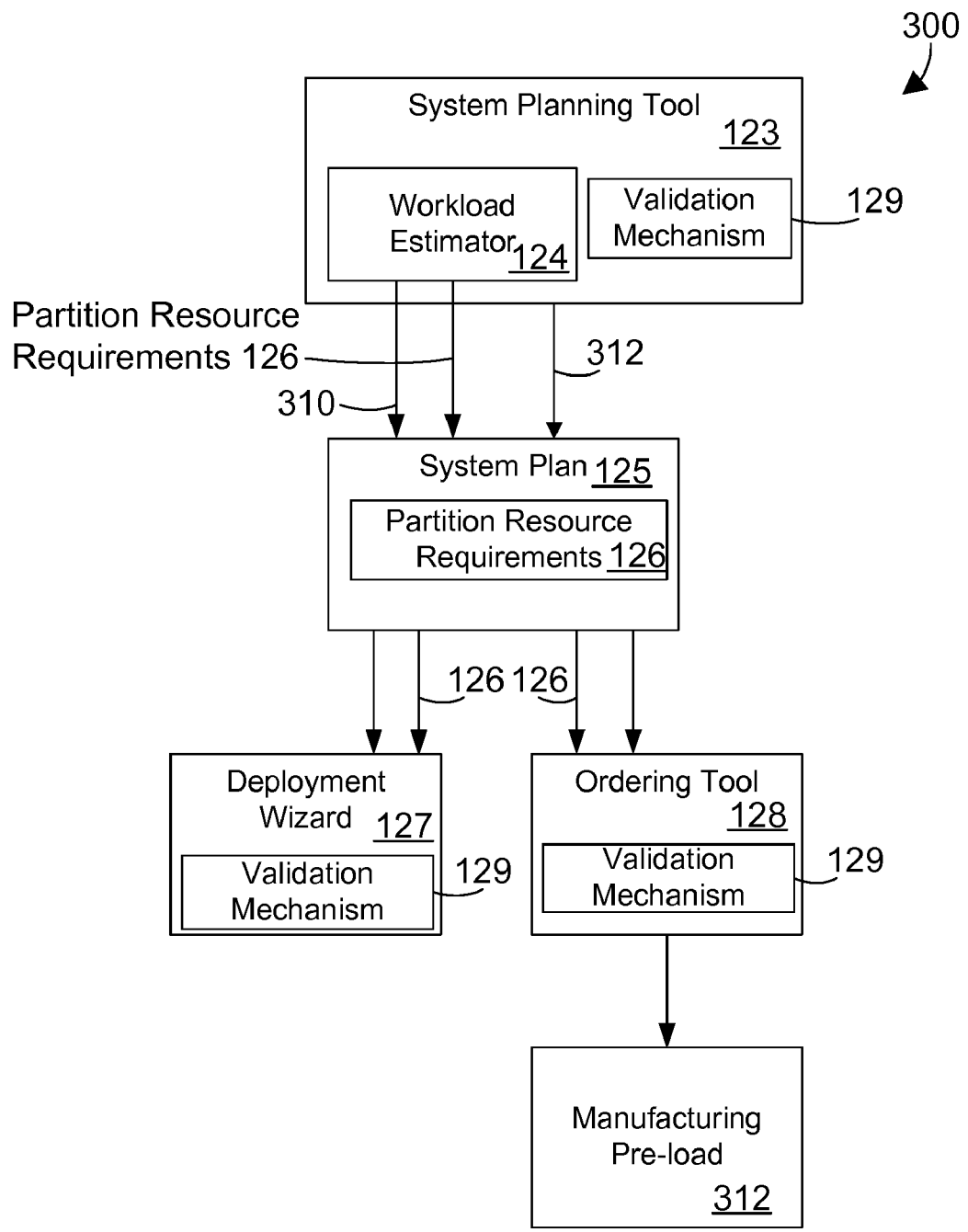
FIG. 3 is a is a block diagram of a system utilizing a system planning tool with a workload estimator as described herein.

FIG. 3 represents a system planning environment 300 that incorporates the components described above with reference to FIG. 1 and in accordance with the claims herein. The system planning tool 123 includes a workload estimator 124, or the workload estimator 124 may be a separate tool (not shown). Similar to the prior art, the workload estimator 124 may provide 310 basic system sizing parameters to the system plan 125. The workload estimator 124 also provides workload information that includes partition resource requirements 126 to the system plan 125. The partition resource requirements include a partition by partition listing of hardware and software resource requirements that are specified by the user with the workload estimator. In the prior art, these partition resource requirements were not individually carried in the system plan 125 and not used by the subsequent tools. The system planning tool 123 uses the partition resource requirements 126 to perform validation of the system plan as described further below. The system planning tool 123 may also provide additional system data 312 to the system plan 125. This additional system data 312 may include other optional features selected by the user to be included in the specified computer system. The system plan 125 with the partition resource requirements 126 is passed to a deployment wizard 127 to automate deployment of hardware and partition configuration. In addition, the system plan 125 is passed to an ordering tool 128 that allows a manufacturer to create pre-loaded system that that complies with the system plan 125. The deployment wizard 127 and the ordering tool 128 may also perform validation of the system plan with a validation mechanism 129 that uses the partition resource requirements 126.

As described herein, workload information with partition resource requirements 126 is included with basic hardware information and passed from the workload estimator in the system plan 125. The system plan consists of all of the physical and virtual attributes of a system. The system plan 125 is preferably an XML-based document that complies with a specification known as Common System Definition Markup Language (CSDML). The CSDML includes partition definitions, which specify the operating system of the partition, amount of required memory, and other information. As used herein, partition resource requirements 126 include the type and version of software that is to be run on each partition of the system and the minimum hardware resources needed to support this software for each partition. The actual partition resources selected by the user for the system may be different than the partition resource requirements and are also included in the system plan.

A system administrator or computer customer uses the workload estimator to identify a system to support needed software and partitions. The workload estimator may be a web-based tool for use by the customer to identify a computer system from the manufacturer of the computer systems. When finished with the workload estimator tool, the system plan that includes the partition resource requirements is then passed to the system planning tool. This application is used in order to plan and validate the hardware and partitions of the computer systems. After planning is complete, the system plan is then passed to one of two applications, depending on the intent of the user. The order tool is for placing orders to the manufacturer for new and upgraded computer systems and servers. The order tool would view the workload information in the system plan and assist the user to order the specified system with the applications pre-loaded to the partitions, thereby circumventing a manual process for the end user. These tools can further validate the proposed system against the partition resource requirements in the system plan.

Alternatively, a deployment wizard executing on an existing system can apply the system plan to the logical partitions (LPAR) of an existing computer system. For example, the LPAR Deployment Wizard developed by IBM can be use the system plan to automatically configure a computer system. The LPAR Deployment Wizard is responsible for performing automatic partition creation and configuration from a system plan. The LPAR Deployment Wizard may perform the following steps:

validation of the actual hardware on the system is performed in order to ensure that the hardware on the system meets the minimum partition resource requirements in the system plan on a partition by partition basis validation of the partition layout on the system is performed in order to ensure that the system is in the proper state for partition creation and configuration creating one or more partitions on the system, and assigned the memory, processors, hardware, and other characteristics contained in the system plan installing operating systems on partitions of the system virtual connections between partitions are created extra virtualization capabilities are created on partitions with particular operating systems.

As described above, the deployment wizard validates the hardware, creates the partitions and loads operating systems. With the partition resource requirements in the system plan as described herein, the deployment wizard can now validate the installation of particular versions of workload software by the manufacturer on the partitions of the system based on the specification in the system plan, or it could prompt the user for manual installation. Automatic installation of the software is done as known in the prior art. The partition resource requirements in the system plan provide the needed information for the deployment wizard to validate the identified version of the software in the identified operating system partition.

There are several advantages to bundling the partition resource requirements with the other system plan information. First, the minimum partition requirements for each partition as specified by the workload estimator allows the tools to validate that the partition will have the resources needed to support the specified workload. Second, this information can actually be used to plan the partition configurations for new systems. Third, the installation of the software can be validated to the workload estimates after changes have been made to the system plan. Additionally, as new types of workloads are defined, the workload estimator tool could easily validate such workloads, which would help the end user enhance or upgrade the software that is running on the partitions.

Figure 4:
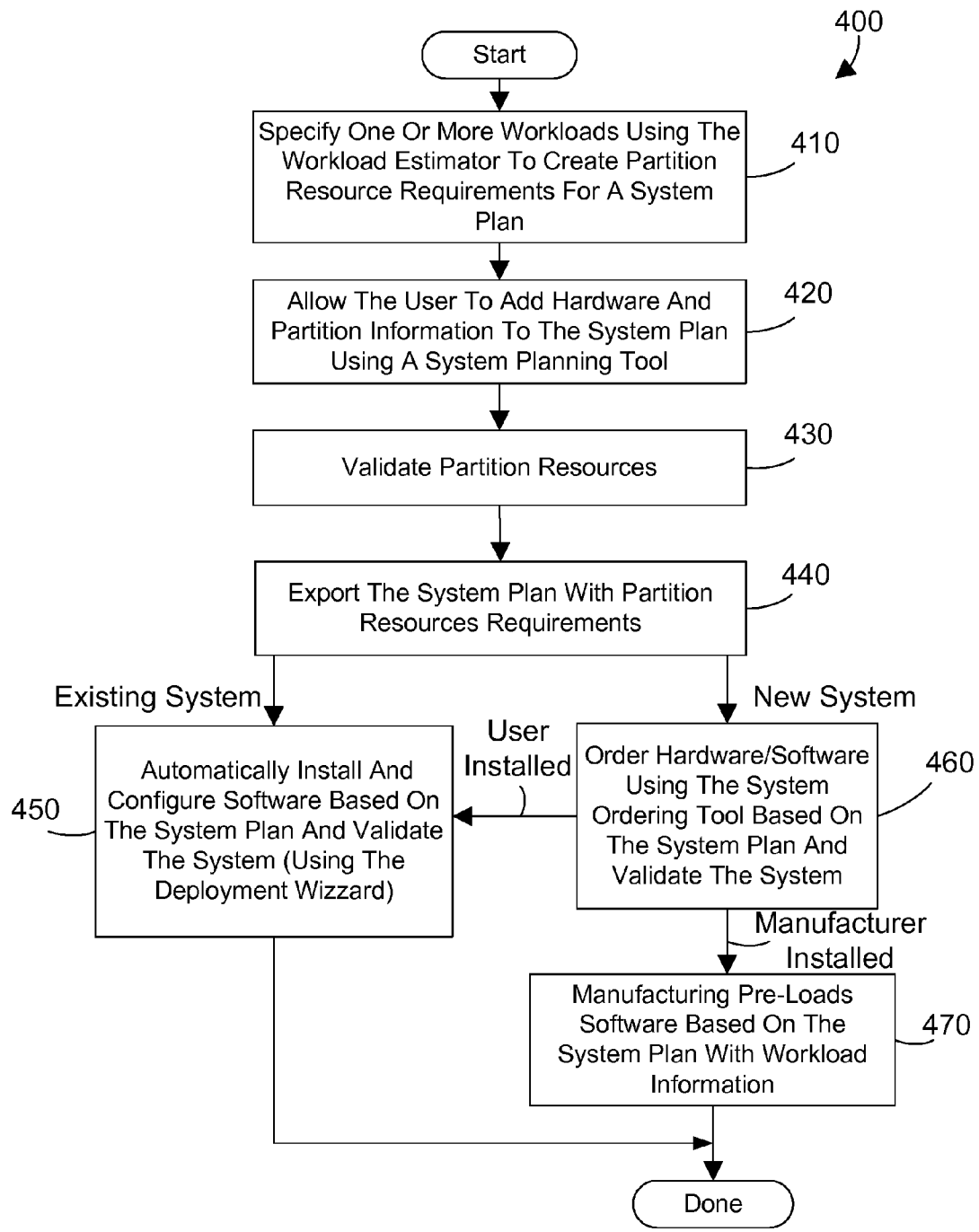
FIG. 4 is a method flow diagram that illustrates a method for utilizing partition resource requirements from a workload estimator by a deployment wizard and an ordering tool.

FIG. 4 shows a method 400 for utilizing partition resource requirements from a workload estimator. The steps in method 400 are preferably performed by the workload estimator, the validation mechanism and the other entities in the system planning environment 300 shown in FIG. 3. First, specify one or more workloads using the workload estimator to create a system plan with a workload configuration for system partitions (step 410). The workloads include the type and version of the software to be run on a each particular partition defined by the user using the workload estimator. Next, allow the user to add hardware and partition information using a system planning tool (step 420). Next, validate the system partition resources on a partition by partition basis using the partition resource requirements (step 430). Then export the system plan with partition resource requirements specified by the workload estimator (step 440). For an existing system, automatically install and configure software in system partitions based on the system plan with the partition resource requirements (using a deployment wizard) (step 450). The method is then done. For a new system, order hardware and software using a system ordering tool based on the system plan with the workload configuration (step 460). For a user installed system, proceed to step 450. For a manufacturer installed system, preload the software based on the system plan with partition resource requirements prior to shipping the system from the manufacturer (step 470). The method is then done.

Figure 5:
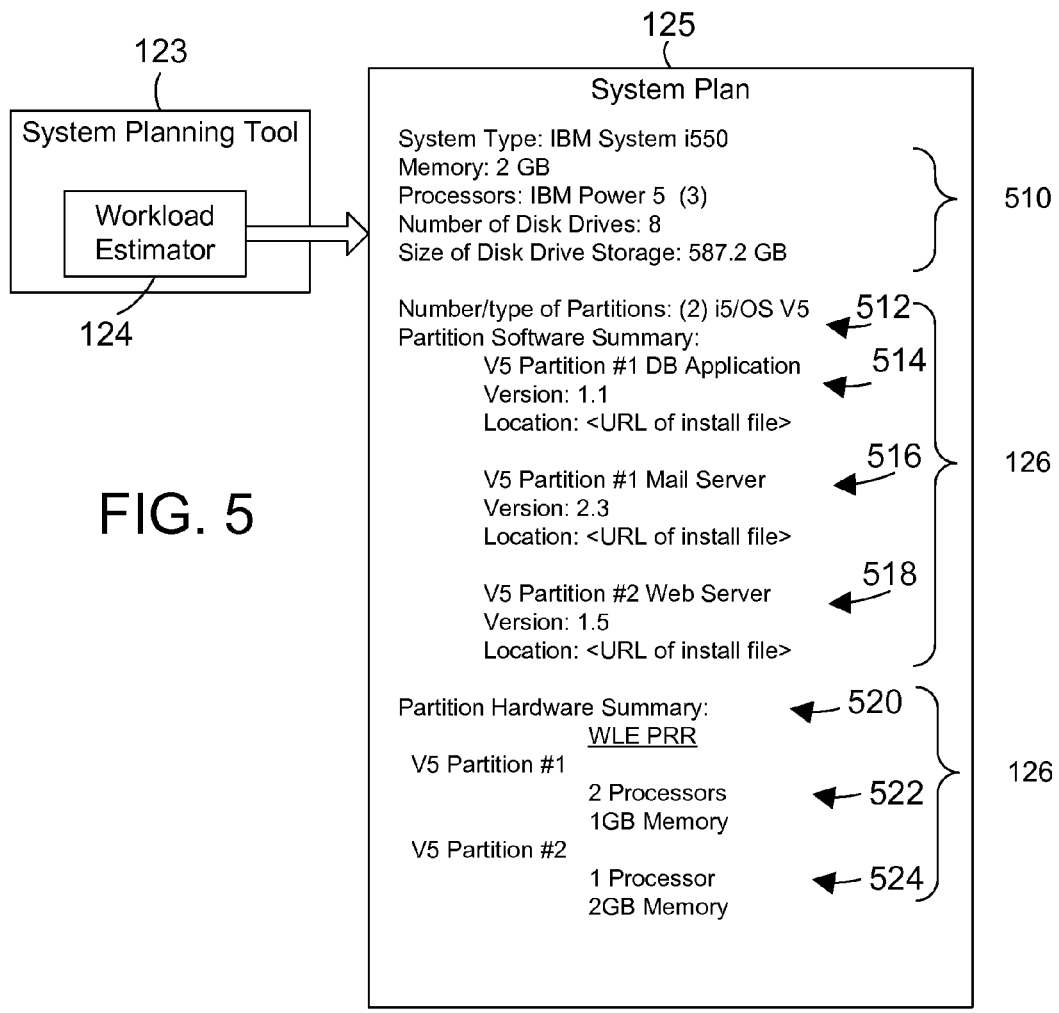
FIGS. 5-6 are block diagrams that illustrates an example of the method described in FIG. 4.
Figure 6:
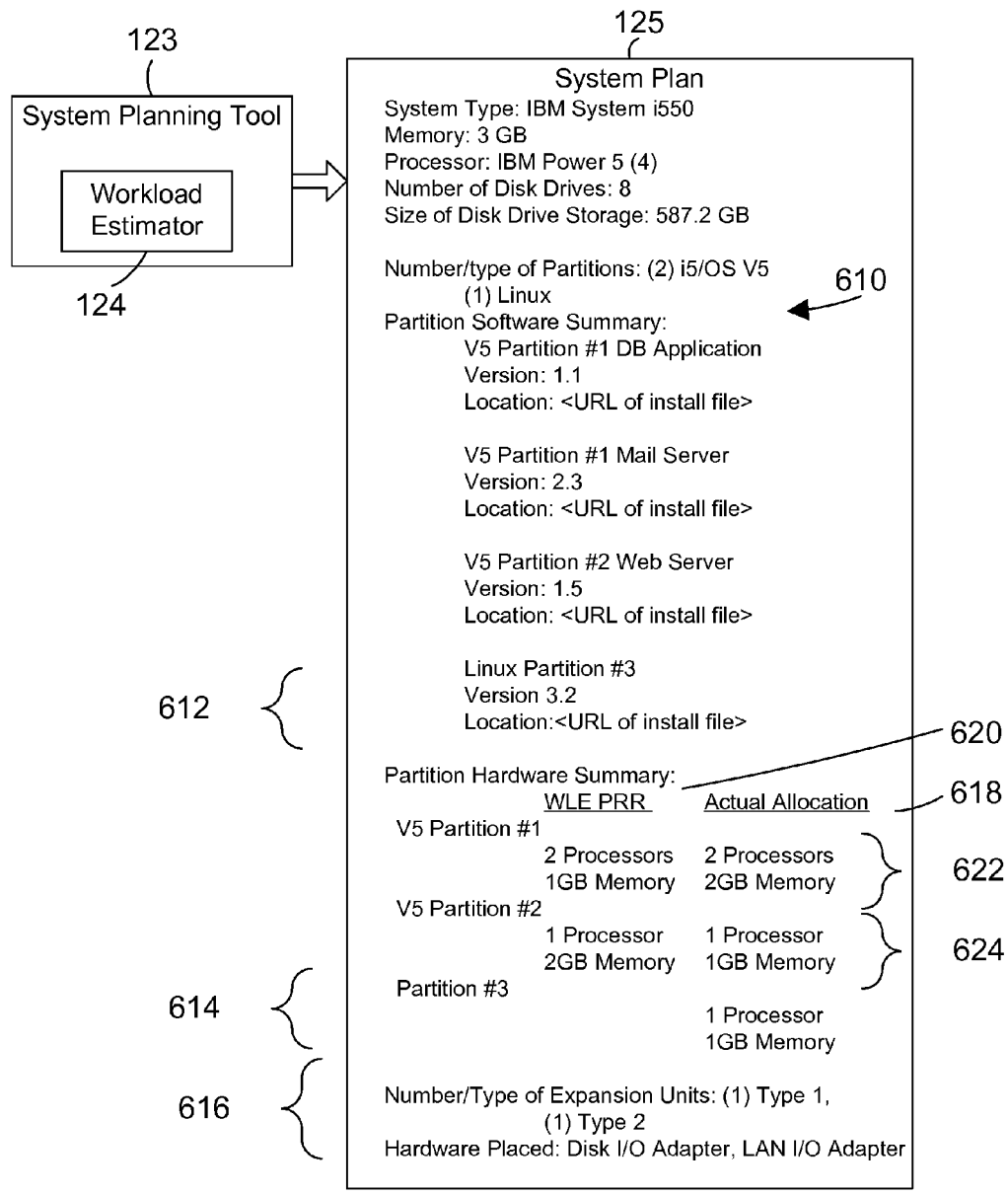

FIGS. 5 and 6 illustrate an example of utilizing workload estimation information to automate computer partition configuration as described above. FIG. 5 illustrates an example of specifying workloads using the workload estimator as described in step 410 of FIG. 4 to create a system plan 125 with partition resource requirements 126. The user (not shown) of the workload estimator 124 is first given options to specify a base system with the desired hardware configuration parameters. For this example we assume the base system parameters are specified as shown 510. This base system includes an IBM System i550, 2 GB of memory, three (3) IBM Power 5 processors and 8 disk drives with 587.2 GB of storage. The user is then given an opportunity to define partition resources 126 that includes a number of partitions and software application (workloads) running on those partitions. This information may be collected by the workload estimator 125 by prompting the user through a set of questions. In this example, the user has selected two partitions 512, each having version 5.0 of the i5/OS operating system. Partition #1 has a database application 514 (version 1.1 at a specified location) and a mail server application 516 (version 2.3 at a specified location). Partition #2 is a web server application 518 (version 1.5 at a specified location.) In each case, the specified location may be a uniform resource locator (URL), or some other pointer that indicates the source location to find the install file for the specified application. Using the inputs from the user, the workload estimator 125 determines minimum partition resource requirements for each partition as shown in the partition hardware summary 520. In this example, partition #1 is allocated two processors and 1 GB of memory 522 and partition #2 is allocated 1 processor and 2 GB of memory 524.

FIG. 6 further illustrates the example of utilizing workload estimation information to automate computer partition configuration. FIG. 6 illustrates the system plan as described in FIG. 5 with the modifications discussed below. FIG. 6 first illustrates step 420 of FIG. 4 operating on the system plan 125. The user of the system planning tool 124 is given an opportunity to add additional features to the system specified in the system plan 126. In this example, the user has specified one additional Linux partition 610. The Linux partition 610 is partition #3 612. Partition #3 612 is assigned 1 processor and 1 GB of memory 614. In addition, the user has added two expansion units (one each of type 1 and type 2), a disk I/O adapter and a LAN I/O adapter 616. Using the system planning tool, the user is also able to modify the actual allocation of hardware 618 used for each partition. The system plan 125 retains the original partition resource requirements from the workload estimator in a separate column 620 to be used for validation as described below. In this example, the user has created an actual hardware allocation for partition #1 622 of 2 processors and 2 GB of memory and an allocation for partition #2 624 of 1 processor and 1 GB of memory. At this point, the modified system plan can be validated as shown in step 430 of FIG. 4.

To validate the system plan 125, the minimum partition resource requirements 620 that were added to the system plan by the workload estimator will be compared to the actual allocation of partition hardware on a partition by partition basis. Within the partition planning tool, a user has the option of modifying partition resource allocations as described above. Therefore, it is possible for the user to manually underallocate partition resources that are less than the minimum partition resource requirements the workload tool has calculated. If this occurs, the partition planning tool will output an error message informing the user which resources must be increased (and by how much) in order for the system plan to successfully install the software application(s) specified by the workload tool. In the example shown in FIG. 6, the user has allocated 1 GB of memory for partition #2 624, but the workload estimator provided a partition resource requirement of 2 GB of memory 626. The validation mechanism will output an error message for this reduction in partition resources. In contrast, if the minimum partition resource requirements are exceeded, no message need be shown, as the partition will contain enough resources to install and run the software application(s) specified by the workload tool. This is illustrated in FIG. 6 where actual allocation of memory for partition #1 has been increased to 2 GB 622. The additional resources could be indicated to the user for informational purposes.

The system plan as modified by the user is now ready to pass to the deployment wizard 127 or the order tool 128 as described above and shown in FIG. 4. These tools can use the validation mechanism to validate that the system as now specified meets the specifications originally specified by the user in the workload estimator and stored in the partition resource requirements. The minimum partition resource requirements that were added to the system plan by the workload planning tool can be compared in the deployment wizard in the same manner as described in the previous paragraph. If the minimum partition resource requirements are not met, the autoinstallation of the software on that partition will fail. In this case, an error message will be shown to communicate this to the user. If the requirements are exceeded, the autoinstallation can proceed normally. Similarly, the validation can also be performed by the ordering tool during the ordering process when systems are configured. As described above, the validation process for the autoinstallation tool compares the partition resource requirements from the workload estimator to the actual allocation of resources on a partition by partition basis. If the resource requirements are not met, autoinstallation cannot be performed.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

What is claimed is:

1. An apparatus comprising:
   at least one processor;
   a memory coupled to the at least one processor; and
   a system planning tool with a workload estimator in the memory and executed by the at least one processor, where the workload estimator:
   (A) allows a user to specify one or more workloads to create partition resource requirements that includes a type and version of software to be stored in a plurality of partitions and minimum hardware resources for each of the plurality of partitions;
   (B) stores the partition resource requirements in a system plan; and
   (C) exports the system plan to automatically install and configure the software.

2. The apparatus of claim 1 wherein the system plan is an extensible markup language based document that complies with Common System Definition Markup Language (CS-DML).

3. The apparatus of claim 1 wherein the workload estimator is a web-based tool for a manufacturing customer to estimate computer needs prior to ordering a computer system.

4. The apparatus of claim 1 wherein the system plan is exported to a deployment wizard for installing, configuring and validating the system for the specified workloads on an existing computer system.

5. The apparatus of claim 1 wherein the system plan is exported to an ordering tool to allow the user to order a new computer system from a manufacturer where the manufacturer uses the partition resource requirements to pre-load the new computer system with the specified workloads and validate the system using the partition resource requirements.

6. The apparatus of claim 1 wherein the system plan is exported to an ordering tool to allow the user to order a new computer system from a manufacturer where the user then uses a deployment wizard for installing, configuring and validating the system for the specified workloads on the new computer system.

7. A computer-implemented method executed by at least one processor for utilizing partition resource requirements from a workload estimator to automate computer partition configuration, the method comprising the steps of:
 (A) specifying one or more workloads using a workload estimator to create partition resource requirements on a partition by partition basis that includes a type and version of software to be stored in a plurality of partitions and minimum hardware resources needed for each of the plurality of partitions;
 (B) storing the partition resource requirements in a system plan; and
 (C) exporting the system plan to automatically install and configure the software.

8. The method of claim 7 further comprising the steps of:
 (E) adding additional hardware and partition information to the system plan using a system planning tool to create an actual allocation of hardware resources for each partition; and
 (F) validating the system plan by comparing the actual allocation of hardware resources with the minimum hardware resources stored in the system plan with the workload estimator.

9. The method of claim 7 wherein the workload estimator is a web-based tool for a manufacturing customer to estimate computer needs prior to ordering a computer system.

10. The method of claim 7 wherein the system plan is exported to a deployment wizard for installing and configuring the software for the specified workloads on an existing computer system.

11. The method of claim 7 wherein the system plan is exported to an ordering tool to allow the user to order a new computer system from a manufacturer where the manufacturer uses the partition resource requirements to pre-load the new computer system with the specified workloads.

12. A method for deploying computing infrastructure, comprising integrating computer readable code into a computing system, wherein the code in combination with the computing system perform the method of claim 7.

13. A computer-implemented method executed by at least one processor for utilizing partition resource requirements from a workload estimator to automate computer partition configuration, the method comprising the steps of:
 (A) specifying one or more workloads using a workload estimator to create partition resource requirements on a partition by partition basis that includes a type and version of software to be stored in a plurality of partitions and minimum hardware resources needed for each of the plurality of partitions, wherein the workload estimator is a web-based tool for a manufacturing customer to estimate computer needs prior to ordering a computer system;
 (B) storing the partition resource requirements in a system plan;
 (C) adding additional hardware and partition information to the system plan using a system planning tool;
 (D) exporting the system plan to a deployment wizard to automatically install, configure and validate the system for the specified workloads on an existing computer system;
 (E) adding additional hardware and partition information to the system plan using a system planning tool to create an actual allocation of hardware resources for each partition; and
 (F) validating the system plan by comparing the actual allocation of hardware resources with the minimum hardware resources stored in the system plan with the workload estimator.

14. The method of claim 13 wherein the system plan is exported to an ordering tool to allow the user to order a new computer system from a manufacturer where the manufacturer uses the partition resource requirements to pre-load the new computer system with the specified workloads.

15. An article of manufacture comprising:
 a non-transitory computer-readable storage medium with an executable program stored thereon including a system planning tool with a workload estimator, where the workload estimator instructs a processor to perform the following steps:
 (A) allows a user to specify one or more workloads using a workload estimator to create partition resource requirements on a partition by partition basis that includes a type and version of software to be stored in a plurality of partitions and minimum hardware resources needed for each of the plurality of partitions;
 (B) stores the partition resource requirements in a system plan; and
 (C) exports the system plan to automatically install and configure the software.

16. The article of manufacture of claim 15 wherein the system plan is an extensible markup language based document that complies with Common System Definition Markup Language (CSDML).

17. The article of manufacture of claim 15 wherein the workload estimator is a web-based tool for a manufacturing customer to estimate computer needs prior to ordering a computer system.

18. The article of manufacture of claim 15 wherein the system plan is exported to a deployment wizard for installing and configuring the software for the specified workloads on an existing computer system.

19. The article of manufacture of claim 15 wherein the system plan is exported to an ordering tool to allow the user to order a new computer system from a manufacturer where the manufacturer uses the partition resource requirements to pre-load the new computer system with the specified workloads.

20. The article of manufacture of claim 15 wherein the system plan is exported to an ordering tool to allow the user to order a new computer system from a manufacturer where the user then uses a deployment wizard for installing and configuring the software for the specified workloads on the new computer system.

* * * * *